March 23, 1971   L. R. BOLDUC   3,572,344
ELECTRODE APPARATUS WITH NOVEL LEAD CONSTRUCTION
Filed Dec. 31, 1968
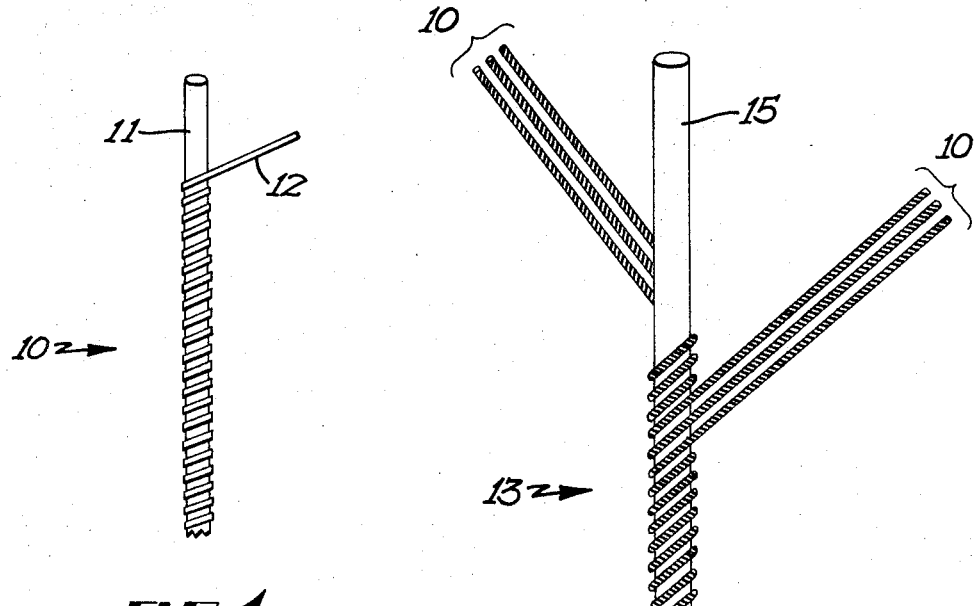
FIG 1
FIG 2
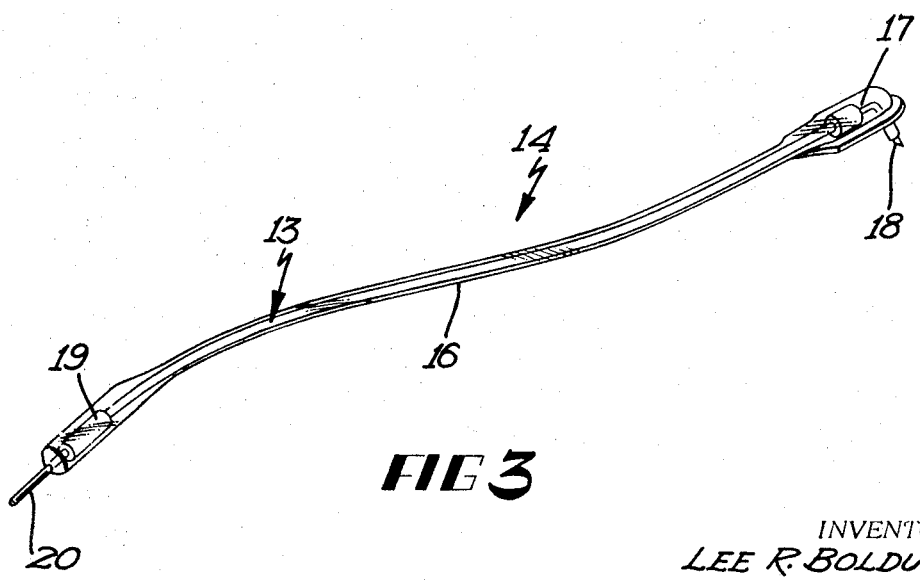
FIG 3
INVENTOR.
LEE R. BOLDUC
BY
Lew Schwartz
ATTORNEY United States Patent Office 3,572,344
Patented Mar. 23, 1971

3,572,344
ELECTRODE APPARATUS WITH LEAD CONSTRUCTION
Lee R. Bolduc, St. Louis Park, Minn., assignor to Medtronic, Inc., Minneapolis, Minn.
Filed Dec. 31, 1968, Ser. No. 788,197
Int. Cl. A61n 1/04
U.S. Cl. 128—418                                     8 Claims

ABSTRACT OF THE DISCLOSURE

Electrode apparatus for implantation in the body and having at least one electrode at one end, and at least one electrical conductor at the other end for connection to a source of electrical signal. The electrode and conductor are interconnected by a flexible electrical conductor lead that has a nonconductive core around which are wrapped a plurality of conductor strands. Each strand comprises an electrical conductor strip wrapped around a separate non-conductive core. The strands and strips are helically wound around their respective core, and the windings are spaced one from the other.

BACKGROUND OF THE INVENTION

This invention is generally concerned with implantable electronic devices for the stimulation of various selected portions of the body. Those familiar with the art will recognize that as the number and quality of implantable electronic stimulating devices increases, the capability of the electrode apparatus which connects the electronic signals to the body becomes increasingly important. In the prior art, one of the better known forms of electrode conductors has been a coiled lead, usually of stainless steel. As the conductor for electrodes of the type of this invention must lay somewhat free within the body to allow for movement, flexibility of the lead becomes highly important. Further, as the electrical stimulating signals are of a relatively small magnitude, high conductivity of the lead is essential. Also, the lead used must be of a material that is substantially inert to body fluids and tissue.

The prior mentioned coiled lead is used in the art because it can withstand flexing without breaking to a greater extent than a straight uncoiled lead. Stainless steel is a material substantially inert to body fluids and tissue, and is generally used in such coiled leads, though platinum or platinum-iridium alloys are sometimes used and are preferable but for the added expense.

Another type of lead used in implantable electronic devices comprises a non-conductive core having helically wrapped around it a plurality of overlapping or touching windings of a plurality of conductive strips. Such a lead has increased tensile strength, as described in the article "Permanent Intracardiac Stimulation for Complete Heart Block and Adams-Stokes Syndrome" by H. Lagergren, in Acta Chir Scand, 1966. However, continuous flex tests of the type of leads described in the Lagergren article reveal a wearing of the helically wound strips, apparently at least partially caused by friction between the windings. The apparatus of this invention overcomes the problems existent in the art and provides a highly conductive and highly flexible lead, with increased tensile strength.

SUMMARY OF THE INVENTION

Briefly described, the apparatus of this invention comprises an electrode device having a lead interconnecting electrical conductor surfaces at the extremities of the lead; at least a portion of the lead comprising a flexible non-conductive core, preferably of a fiber like material, having wound thereon a plurality of electrical conductor strands with each winding of a strand being spaced from adjacent strand windings on the core. Each strand comprises a separate non-conductive core, preferably of a fiber like material, having wound thereon a strip of electrical conductor material. The strip is preferably of a thin, flat shape, and is helically wound aroung its core with each winding spaced from adjacent windings. The strands have a generally cylindrical cross section. The structure of the strand enables the use of platinum or platinum-iridium alloy, giving increased resistance to body fluids and tissue, and increased conductivity over stainless steel. In addition, the same conductive material can then be used for the tissue interface when platinum or platinum-iridium alloys are used as conductor strands.

Comparison can be made between the electrode of the present invention and the electrode structure disclosed in U.S. Pat. No. 3,198,195 to W. M. Chardack when both electrodes are constructed of platinum. The present electrode, when made with six conductor strands, has less than one-tenth the manufacturing cost, about one-half the electrical resistance, about fifteen times the tensile strength of, much better flex resistance than, and six times redundancy over the electrode structure of the above patent.

BRIEF DESCRIPTION OF THE DRAWING

FIG. 1 is a perspective view of an electrical conductor strand of the apparatus of this invention;

FIG. 2 is a perspective view of the electrical conductor lead apparatus of this invention; and FIG. 3 is a perspective view of the asembled apparatus of this invention.

DESCRIPTION OF THE PREFERRED EMBODIMENTS

FIGS. 1, 2 and 3 are blow-ups of the respective apparatus they disclose, for purposes of better description, and are not intended to be in scale.

Referring first to FIG. 1, there is shown an electrical conductor strand indicated generally at 10. Strand 10 comprises an electrically nonconductive core 11, preferably of a fiber material such as Dacron, around which is helically wound an electrical conductor strip 12. Strip 12 is a thin, flat metal strip. Preferably, strip 12 is platinum or a platinum-iridium alloy. Stainless steel may also be used but the rolling process to achieve a thin, flat strip of stainless steel is more expensive than that for platinum or platinum-iridium alloys and stainless steel is not as inert to body fluids. Strip 12 is helically wound on core 11 such that adjacent windings are in spaced relation to one another. When wound, the general configuration of the cross section of strand 10 is cylindrical.

Referring now to FIG. 2, there is shown a lead indicated generally at 13. Lead 13 comprises another electrically nonconductive core 15, also preferably of a fiber material such as Dacron. A plurality of strands 10 are helically wound around core 15, in a manner such that each winding is in spaced relation to the adjacent winding of leads 10 around core 15. When the plurality of leads 10 has been wound on core 15, the general configuration of the cross section of lead 13 is cylindrical.

Referring now to FIG. 3, there is shown an electrode apparatus indicated generally as 14. Apparatus 14 comprises a lead such as 13 of FIG. 2 which at one extremity is connected through a connection means 17 to an exposed electrical conductor surface 18, here shown as a pointed metal member adapted to connect to a portion of the body. Connection means 17 and exposed conductor surface 18 can, if desired, be further portions of lead 13 if conductor strips 12 and cores 11 and 15 are highly inert to body fluids and tissue. The other extremity of lead 13 is connected through a connection device 19 to another exposed electrical conductor surface 20, here shown as a pin adapted to be connected to a source of electrical stimulation signals. Lead 13, and at least a portion of connection devices 17 and 19 are all enclosed in a substance 16, which substance is substantially inert to body fluids and tissue.

In operation, surface 18 will be connected to the portion of the body it is desired to stimulate, and surface 20 will be connected to a source of electrical signal. The construction of lead 13, as described above and shown in FIGS. 1 and 2, results in a highly flexible interconnecting lead for the electrode apparatus, which has an improved tensile strength or resistance to breakage due to flex, over the prior art leads. This is in part due to the spacing between the helically wound strip 12 on core 11, and the spacing between the helically wound strands 10 on core 15. Further, tests have shown that lead 13, constructed as shown in FIGS. 1 and 2 and described above, has a high electrical conductivity. Finally, by the use of thin, flat metal strips such as strip 12 of FIG. 1, it becomes financially practical to use material such as platinum and platinum-iridium alloys, instead of being confined to the use of stainless steel. Platinum and platinum-iridium alloys are preferable as having greater life in the presence of body fluids and tissue, and an improved conductivity.

It is apparent from the foregoing description that the apparatus of this invention provides an improved implantable electrode apparatus for use in carrying electrical stimulating signals from a source to the portion of the body it is desired to stimulate. It is not intended that the invention be limited to the particular electrode apparatus shown in FIG. 3, though it will be apparent that the invention is applicable to other implanatable electrodes as well.

What is claimed is:

1. An implantable electrode apparatus including at least a first exposed surface adjacent one extremity and substantially inert to body fluids and tissue, the first exposed surface adapted to transmit electrical stimulating signals to body tissue, at least a second exposed surface adjacent the opposite extremity and substantially inert to body fluids and tissue, the second exposed surface adapted to connect the apparatus to a source of electrical signals for stimulating body tissue, and the remainder of the apparatus enclosed in an electrically insulating substance substantially inert to body fluids and tissue, the improvement comprising: electrical conductor means interconnecting the first and second exposed surfaces; at least a portion of said means having a nonconductive, flexible core and a plurality of electrical conductor strands helically wound about said core; each of said strands comprising a nonconductive, flexible support and an electrical conductor strip helically wound on each of said supports; said strips being of a first material substantially inert to body fluids and tissue; and said supports and said core being of a second material substantially inert to body fluids and tissue and of substantially greater tensile strength than said first material.

2. The apparatus of claim 1 in which said core and said supports each comprise a fiber material.

3. The apparatus of claim 1 in which each winding of said strands on said core is in spaced relation to all adjacent windings of said strands on said core.

4. The apparatus of claim 3 in which each winding of said strip on each of said supports is in spaced relation to all adjacent windings of said strip on each of said supports.

5. The apparatus of claim 4 in which said strip in each of said strands comprises a thin, flat strip of electrically conductive material.

6. The apparatus of claim 5 in which each of said strands has a generally cylindrically shaped cross section.

7. The apparatus of claim 5 in which said material comprises platinum.

8. The apparatus of claim 5 in which said material comprises a platinum-iridium alloy.

References Cited

UNITED STATES PATENTS

| | | | |
|---|---|---|---|
| 3,333,045 | 7/1967 | Fisher et al. | 128—418 |
| 3,367,339 | 2/1968 | Sessions | 128—418 |
| 3,474,791 | 10/1969 | Bentov | 128—418 |

WILLIAM E. KAMM, Primary Examiner

U.S. Cl. X.R.

174—128